Figure 1:
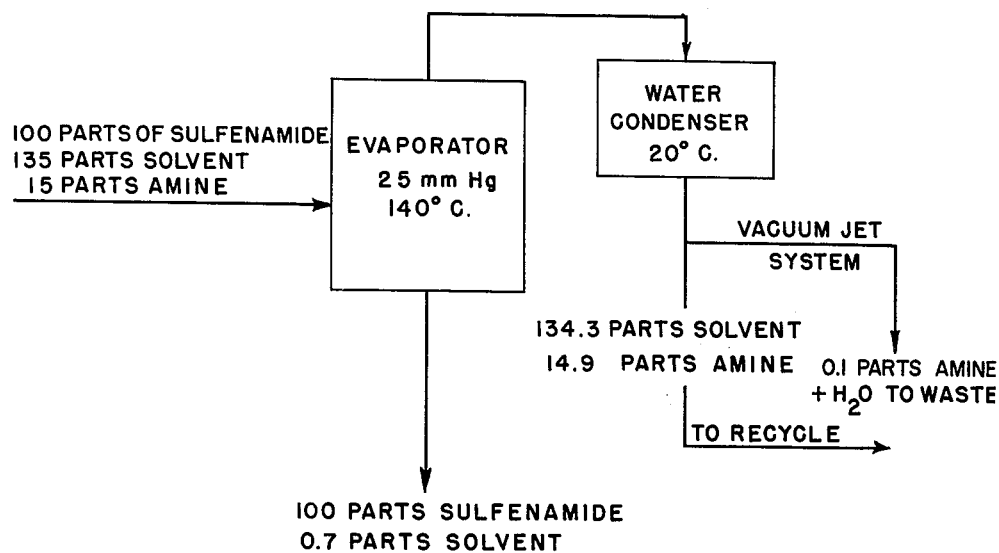

April 25, 1961    R. C. KINSTLER    2,981,325
PREPARATION OF SULFENAMIDES
Filed Nov. 5, 1957

INVENTOR.
ROBERT C. KINSTLER

United States Patent Office 2,981,325
Patented Apr. 25, 1961

2,981,325
PREPARATION OF SULFENAMIDES

Robert C. Kinstler, Middlesex, N.J., assignor to American Cyanamid Company, New York, N.Y., a corporation of Maine Filed Nov. 5, 1957, Ser. No. 694,624

2 Claims. (Cl. 159—47)

This invention relates to the manufacture of sulfenamides. More particularly, it relates to the isolation of a substantially solvent free sulfenamide from a solution of a sulfenamide in an organic solvent.

Sulfenamides in general and particularly certain benzothiazolyl sulfenamides have proved to be excellent accelerators for the vulcanization of rubber. Various successful methods have been proposed for the preparation of such compounds in which a reaction mixture is obtained comprising a solution of sulfenamide in an organic solvent. Illustrative of such methods are those described in U.S. Patents Nos. 2,730,526, 2,730,527, 2,772,278, 2,772,279 and 2,776,297. This solution of sulfenamide is then treated to isolate the sulfenamide in dry form as by evaporation with conventional equipment.

While the evaporation of such a solution would appear to be a simple and straightforward operation, nevertheless, the very nature of sulfenamides creates problems. For instance, because sulfenamides are quite heat unstable, it is necessary to control the maximum temperature employed during evaporation to avoid decomposition. As a result, both throughput capacity of the evaporator as well as reduction of the solvent content are undesirably restricted.

Throughput capacity can obviously be increased by using two or more evaporators in parallel. Such a practice, of course, is accompanied by a corresponding increase in equipment cost. More important, however, is the fact that no matter how many evaporators are employed in parallel, the solvent content of the product taken from each is still governed by the restricted evaporator temperature. On the other hand, solvent content may be reduced by operating at lower pressures. However, the pressure required to reduce the solvent content below about 0.5–1.0% is such as to still further reduce the throughput capacity of the evaporator because the condensing system must handle a considerably greater volume of vapor created by the lower pressure. Moreover, the greater the vacuum in the evaporator, the lower must be the temperature of the cooling fluid in the condensing system.

It is a principal object of this invention, therefore, to provide an improved procedure for isolating a sulfenamide from a solution thereof in an organic solvent. It is a further object of this invention to conduct such an isolation by subjecting such a solution to evaporation. It is also an object of this invention to conduct such an evaporation as heretofore done but in a manner so as to considerably increase the throughput capacity of the evaporator. It is a still further object of this invention to so conduct this evaporation as to obtain a product substantially free of solvent. In addition, it is an object of this invention to evaporate a solution of a sulfenamide in an organic solvent at temperatures lower than heretofore employed whereby decomposition of the sulfenamide is substantially eliminated.

Surprisingly, these objects have been met in a simple yet unexpected manner. In general, the process of this invention comprises evaporating a solution of sulfenamide in an organic solvent in conventional evaporating equipment as heretofore done. In accordance with this invention, however, the evaporation is conducted at higher pressure and lower temperature conditions than heretofore employed whereby a sulfenamide product is taken having a higher solvent content than that of the product taken in prior practice. This product is then introduced into a simple chamber evacuated to a very low pressure in which the remainder of the solvent content is flashed off leaving a substantially solvent-free sulfenamide product.

Figure 2:
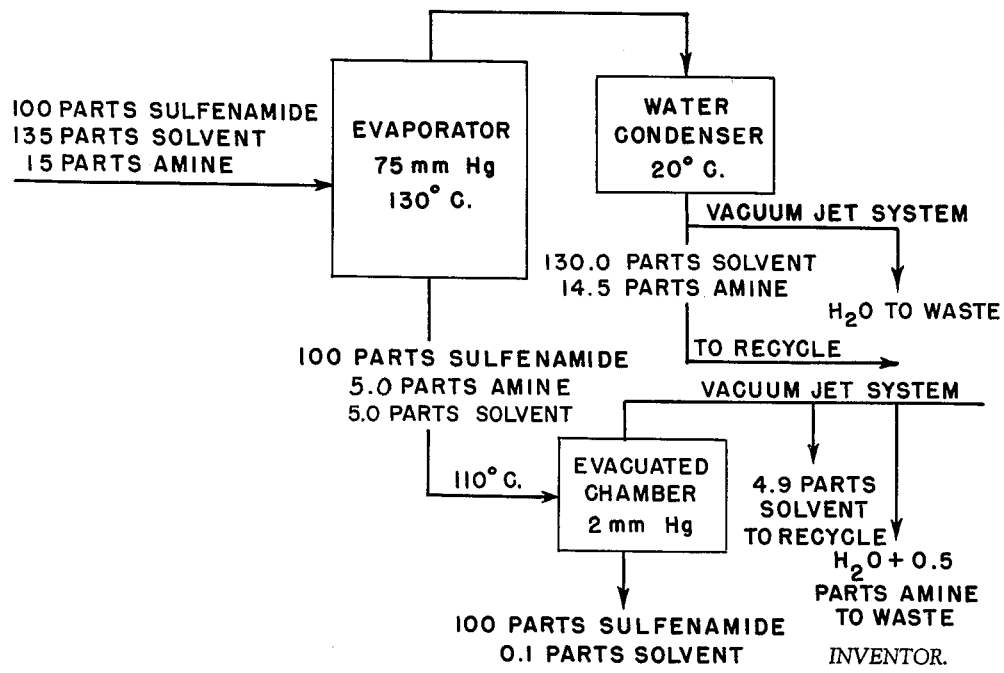

The process of the present invention will be further described by reference to the accompanying drawing in which Figure 1 is a diagrammatic flow scheme of the prior art procedure and Figure 2 is a diagrammatic flow scheme of the present process.

To further facilitate an understanding of the invention, the following examples, which are illustrative only and not by way of limitation, will be described with reference to the drawing. All parts are by weight unless otherwise noted.

Example 1

Referring to Fig. 1, 100 parts of N-oxydiethylenebenzothiazole-2-sulfenamide in a mixture of 135 parts of solvent (monochlorobenzene) containing 15 parts of free amine (morpholine) is fed to a conventional film type evaporator to isolate a dry sulfenamide product. This evaporator is operated at about 25 mm. absolute pressure and 140° C. which have been found to give optimum throughput capacity and solvent removal with a minimum of sulfenamide decomposition. The molten product at 140° C. is taken from the evaporator and cooled. It comprises 100 parts of an N-oxydiethylenebenzothiazole-2-sulfenamide and 0.7 part of monochlorobenzene. The vapors from the evaporator are led to a water condenser operated at 20° C. The condensate comprising 134.3 parts of monochlorobenzene and 14.9 parts of morpholine is recycled for further use in forming additional sulfenamide.

It is apparent that the capacity of the system illustrated by Example 1 and Figure 1 could be readily doubled by using a second evaporator in parallel. As previously pointed out, however, the optimum operating conditions would still result in a product containing 0.5–1.0% solvent. Similarly, it is apparent that the solvent content of the product could be substantially eliminated by further reducing the pressure to 1–2 mm. Hg. The capacity of the evaporator, however, would be seriously reduced because of the increased load on the condensing system caused by the tremendous volume of vapor existing under such vacuum conditions. Such a modification would be impractical for this reason as well as the fact that the condensing fluid temperature would have to be very much lower to operate at such a pressure.

Example 2

Referring to Fig. 2, a similar solution to that of Example 1 is introduced into the same film type evaporator. However, instead of operating the evaporator at the above described conditions of temperature and pressure, it is operated at 75 mm. Hg. and 130° C. The product taken from the evaporator comprises 100 parts of N-oxydiethylenebenzothiazole-2-sulfenamide, 0.5 part amine and 5 parts of solvent. The vapors from the evaporator are led to a water condenser operating at 20° C. The condensate consisting of 130 parts of monochlorobenzene and 14.5 parts of morpholine is recycled. The molten sulfenamide product at about 120–130° C. is taken from the evaporator and introduced into an evacuated chamber maintained at a reduced pressure of 1–2 mm. Hg. The monochlorobenzene and morpholine contents are removed as indicated. The product taken from this chamber consists of 100 parts of N-oxydiethylnenebenzothiazole-2-sulfenamide and 0.1 part of monochlorobenzene obtained in about ⅓ the time required to take the product of Example 1. Throughput capacity of the system of Example 2, therefore, is 2½–3 times greater than that of Example 1 and in addition, a superior quality product is obtained.

Because a smaller volume of vapor is involved at the higher pressure and because the condensation of vapor can be accomplished at higher temperatures, the condenser for the evaporator can be operated at about three times its previous capacity. The heat transfer surfaces in the film type evaporator, moreover, need no longer be used to bring about thorough equilibrium of the boiling product to effect optimum solvent removal. Accordingly, 2½–3 times as much solvent can be evaporated from the same surfaces.

It is apparent, therefore, that a like or even greater capacity can be obtained by the use of a simple evacuated chamber as might be obtained by the use of a second film type evaporator in parallel. This greater capacity, moreover, is obtained without the initial investment accompanying the use of two film type evaporators since flashing involves merely the use of an enclosed evacuated space. In addition, it is obtained with substantially lower operating costs since the only heat required for flashing is the sensible heat of the feed. Particularly surprising, however, is that this increased capacity is obtained while simultaneously producing an isolated sulfenamide product of considerably higher quality. Not only is the solvent content considerably reduced but the evaporation may be conducted at lower temperatures thereby decreasing possible decomposition of the sulfenamide.

The invention as illustrated by the drawing has been described in the axamples with reference to a solution of N-oxydiethylenebenzothiazolyl-2-sulfenamide in monochlorobenzene. As will be apparent to those skilled in the art, however, the process of this invention is just as applicable to other sulfenamides and other solvents. The various temperatures and pressures described in Example 2 are not intended to be limiting but merely illusrate how a throughput capacity as much as three times greater than that of Example 1 can be obtained by the present invention while at the same time upgrading the quality of the product. That the process is quite flexible will be readily recognized by those skilled in the art. The temperatures and pressures throughout the system may be considerably varied and manipulated to produce a particular result or quality of product and these variations are intended to be included within the scope of this invention. To obtain the advantages of this invention, however, the pressure and temperature employed in the evaporator should be such as to give a sulfenamide product for flashing containing not less than about 1.0% solvent.

I claim:

1. In a process for producing a sulfenamide wherein a solution comprising said sulfenamide in an organic solvent is obtained and said solution is subjected to reduced pressure at a temperature above the atmospheric pressure boiling point of said solvent for sufficient time to reduce the residual solvent content to below about 1.0% but above 0.5% and resultant material is cooled to below its solidification temperature at atmospheric pressure whereby a solid product is obtained, the improved method of isolating said sulfenamide which comprises: under an operating pressure below atmospheric but above said reduced pressure, heating said solution to a temperature above the boiling point of the solvent at the operating pressure but below the normal atmospheric boiling point of said solvent; maintaining said temperature and pressure only for sufficient time to remove from about 95% to not more than 99% of said solvent; then, in an enclosed space, subjecting resultant molten sulfenamide-solvent mixture to a lower pressure less than said reduced pressure; maintaining said lower pressure for sufficient time to reduce the solvent content in said resultant molten sulfenamide-solvent mixture to below about 0.5%; and removing so-treated molten sulfenamide-solvent mixture from said enclosed space.

2. A method according to claim 1 in which said lower pressure in said enclosed space is sufficiently low that the solvent content of said removed molten sulfenamide-solvent mixture does not exceed about 0.1% by weight.

References Cited in the file of this patent

UNITED STATES PATENTS

| 1,308,403 | Doonar | July 1, 1919 |
| 2,310,650 | Peebles | Feb. 9, 1943 |
| 2,776,297 | Cherlon | Jan. 1, 1957 |

OTHER REFERENCES

Weissberger et al.: "Technique of Organic Chemistry," Vol. III (1950), page 630.

Gatterman: "Organic Chemistry" (1896), page 11. (Copies of the cited publication are available in Patent Office Library.)